United States Patent Office 3,017,897
Patented Jan. 23, 1962

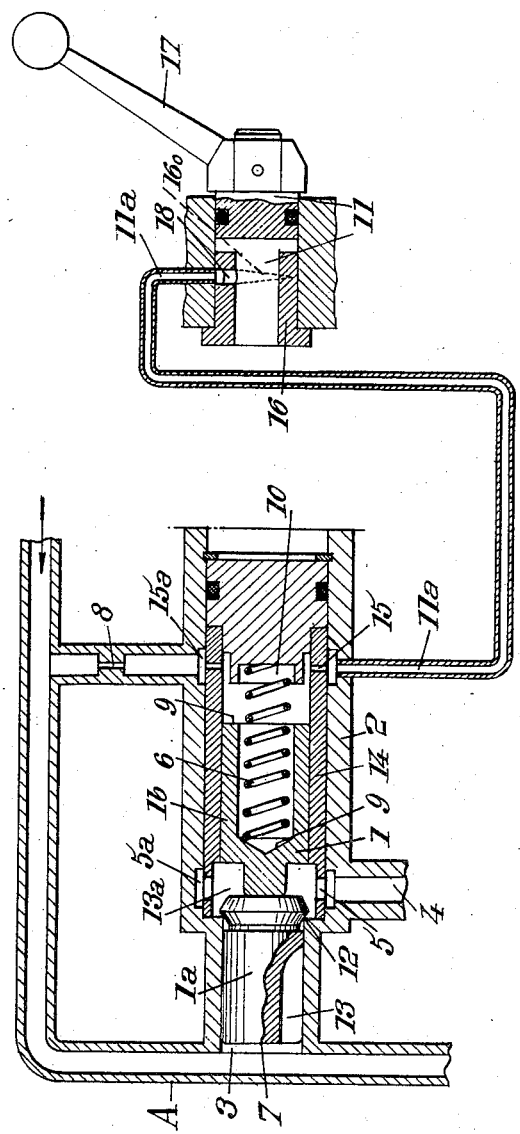

3,017,897
VALVE MEANS FOR CONTROLLING THE
PRESSURE OF A FLUID SYSTEM
Gabriel Jean Seguenot, Paris, France, assignor to Sertec
Societe d'Etudes et de Recherches Techniques, Paris,
France
Filed Aug. 28, 1957, Ser. No. 680,757
Claims priority, application France Aug. 29, 1956
2 Claims. (Cl. 137—529)

The present invention relates to valve means for controlling the pressure of a fluid system, such as a hydraulic or pneumatic circuit, and is concerned more particularly, but not exclusively, with valve means which vary discharge of fluid in dependence upon the pressure of the system to maintain the pressure constantly at a predetermined value.

The object of the invention is to provide valve means for controlling the pressure of a fluid system which comply better than hitherto with the various requirements found in practice and, more particularly, which are lighter and require less space than prior known valve means.

The known valves for controlling the pressure of fluid in a hydraulic circuit are either safety valves or pressure control valves.

Safety valves operate on the all-or-nothing principle, that is to say they are closed when the fluid pressure is normal, and open for a rapid discharge of the fluid only when the pressure exceeds the calibrated pressure of the valve.

Pressure control valves, to which the present invention relates, operate progressively, that is to say the amount of the opening of the valves varies in dependence upon the actual fluid pressure and so controls the discharge flow that the pressure is constantly restored to a predetermined value. If such valves are to supervise high pressures and to allow the removal of large volumes of oil or other fluid, the springs which balance them must be very strong and of such a flexibility that deformations of the springs do not cause wide variations in the pressure exerted by the springs. Such springs however take up considerable space and are heavy and expensive.

The invention overcomes these disadvantages by controlilng the movements of the valve through the agency of an auxiliary pilot circuit which is operated merely by very small amounts of the fluid whose pressure it is required to supervise.

According to the invention there is provided valve means for controlling the pressure of a fluid system, comprising a piston slidably mounted in a cylinder and forming two terminal chambers in the cylinder, one at each end of the piston, the piston being biased into an inoperative position covering a discharge conduit for one of said chambers, characterized in that the chambers are adapted to be connected by conduits to the fluid system and the other of said chambers is connected to a flow restricting discharge device, the degree of opening of which determines the fluid pressure.

The valve means according to the invention may include several other features which will be explained in greater detail hereinafter.

Embodiments of the invention will now be described by way of example with reference to the accompanying drawings, in which:

FIG. 1 is a diagrammatic arrangement illustrating the principle of operation of the valve means.

FIG. 2 is a practical arrangement of the valve means.

The valve means of FIG. 1 comprises a piston 1 slidably mounted in a cylinder 2 and forming two terminal chambers 3, 10 in the cylinder, one at each end of the piston 1. A discharge conduit 4 for the chamber 3 is uncovered only when the piston moves to the right out of its inoperative position, the piston being constantly urged into the inoperative position by a spring 6.

The fluid in the circuit A acts directly on the face 7 of the piston 1 forming a wall of the chamber 3 and also acts, through a flow limiter 8, upon the face 9 of the piston 1 which forms a wall of the chamber 10 and which is opposite the face 7. The chamber 10 is permanently connected to a flow-restricting auxiliary discharge device 11, the degree of opening of which may be adjusted, for instance by manual control (rotation of a hand-wheel, as shown by FIG. 1) to determine the fluid pressure in circuit A.

Apart from piping connecting the various elements to one another and to the hydraulic circuit A containing the fluid whose pressure it is required to supervise, the main or discharge circuit comprises the chamber 3 of the cylinder and the discharge conduit 4, while the secondary or pilot circuit comprises the flow-limiting device 8, the chamber 10 of the cylinder and the discharge-restricting device 11.

The operation of such a valve is directly associated with the operation of the discharge device 11 which operates, in the pilot circuit, much smaller fluid masses than the fluid masses operated in the main circuit A.

If this discharge device 11 is connected to the chamber 10 by a conduit of very reduced cross-section, so that the device 11 can be of very reduced size, calculation shows that, for a given fluid, the pressure $p$ in the pilot circuit, that is to say in the cylinder chamber 10, substantially depends only upon the geometric dimensions of the two restricting devices 8 and 11 and therefore in fact upon the control of the restricting device 11, the pressure $p$ not being affected by fluid temperature which governs fluid viscosity.

Under normal operating conditions, that is to say if the dynamic pressure of the fluid is stable (assuming that the fluid is pressurised for instance, by a pump), the piston is in equilibrium between, on the one hand, the sum of the pressure $p$ of fluid in the chamber 10 and of the pressure $r$ of the spring 6, these two pressures acting upon the piston face 9, and, on the other hand, the pressure P of fluid in the chamber 3, the pressure P acting upon the piston face 7—i.e., $P=p+r$.

Now $r$ has a constant value (which can be very small, for instance, as little as 2 kg. for a maximum permissible fluid pressure of 100 kg./cm.$^2$), while the value of $p$ varies in dependence upon the opening of the restricting device 11.

Therefore, and assuming that a predetermined pressure P is required in the main circuit:

If the actual pressure in the main circuit is greater than P, the difference between the value P and the difference between the value P and the value $p+r$ acts upon the piston and moves the same to the right in FIG. 1 so that at least part of the discharge aperture 5 is uncovered, with the result that the actual pressure is reduced until equilibrium is regained;

If, on the other hand, the actual pressure is less than P—and of course the degree of opening of the restricting device 11 is so adjusted that such a state can occur only if the discharge aperture 5 is at least partly uncovered—the difference between the pressure $p+r$ and the pressure P moves the piston to the left to colse the aperture 5, with the result that the actual pressure of fluid in circuit A tends to increase and to be restored to the value P.

Hence with such a system, the pressure in the main circuit A can be controlled accurately and very easily.

Of course, the discharge device 11 could be formed by any member, other than that above described, which could operate in a similar manner to provide a selected constant leak from chamber 10 under automatic or manual control.

In the piloted valve of FIG. 2 the piston comprises two separate parts—a plunger 1a and sleeve 1b. The plunger 1a comprises a conical part adapted to engage in sealing-tight manner with a seating 12 which has a rounded cross-section and on which the conical part can be ground in, and with a lengthwise groove 13 opening into the cylinder chamber 3 and adapted to communicate with the aperture 5 of the discharge conduit 4, preferably by way of an annular chamber 13a, only when the plunger 1a is not in engagement with its seating.

The sleeve 1b is slidably mounted in a bush 14 which is disposed in the cylinder 2 and which is formed with wide apertures 5 and with narrow apertures 15 communicating, by way of associated annular grooves 5a and 15a in the cylinder 2, with the discharge conduit 4 and the pilot circuit 8, 11.

The resilient restoring means 6 could very well be gravity-operated, if the cylinder axis was vertical, or could be omitted if there were slight differences between those areas of the opposite piston faces 7, 9 on which the fluid pressure acts.

In the embodiment illustrated, the restoring means take the form of a spring 6 bearing at one end against the inner face of the sleeve 1b and at the other end against the terminal wall of the cylinder chamber 10. The discharge device 11 illustrated in FIG. 2 is a flow-restricting device mainly formed by a hollow cylinder 16 which can be rotated around its axis by a handle 17 so as to present, opposite the aperture of the conduit 11a, the opening of a groove 16o of continuously varying cross-section, the groove 16o being formed in a circumferential direction in the outer face of the cylinder 16, the larger end of the groove 16o communicating with the inside of the cylinder 16 through a radial duct 18.

Of course, a plurality of different types of discharge devices, instead of a single discharge device 11, could be connected to one apparatus simultaneously or consecutively for instance, through the agency of a three-way cock; some such discharge devices could even be formed as safety valves, for instance of the kind comprising a ball and calibrated spring, so that a very easy changeover of operation would be possible so far as the valve was concerned.

The advantages of the valve means according to the invention include:

A reduction in weight and space required because of the very reduced amount of fluid necessary to operate it;

Increased accuracy of supervision;

More flexible control;

A reduction or even an elimination of flutter of the piston on its seating, because of the hydraulic equilibrium of the piston which has pressure fluid acting on both its faces;

And ready transition from the supervision of a static pressure to the supervision of a dynamic pressure (merely by changing the discharge device 11), etc.

Of course, and as it is clear from the foregoing, the invention is not limited to those of its methods of application nor to those of the embodiments of its various parts which have been more particularly considered, but includes all the variants.

What I claim is:

1. A valve device including a hollow cylindrical housing, an inlet port in one end of said housing, an outlet port in said cylindrical portion of said housing adjacent said one end of said housing, piston means slidable within said housing forming with said other end of said housing a chamber, and being responsive to fluid pressure within said inlet port, spring means within said chamber biassing said piston to a position covering said outlet port, passage means including a throttled portion communicating said inlet port to said chamber, further passage means in communication with said chamber including manually settable valve means adjustable to a selected constant flow area, adjustment of the manually settable valve means effecting the magnitude of the pressure within said chamber to vary the total force exerted by the spring and fluid pressure within said chamber.

2. A valve device as claimed in claim 1, wherein said throttled portion is of fixed cross-section.

References Cited in the file of this patent

UNITED STATES PATENTS

| | | |
|---|---|---|
| 2,011,333 | Clifton | Aug. 13, 1935 |
| 2,064,864 | Temple | Dec. 22, 1936 |
| 2,622,610 | Rowe | Dec. 23, 1952 |
| 2,639,103 | Ball et al. | May 19, 1953 |
| 2,655,935 | Kinzbach | Oct. 20, 1953 |
| 2,807,273 | Hare | Sept. 24, 1957 |
| 2,807,274 | Evans | Sept. 24, 1957 |
| 2,902,047 | Tavener | Sept. 1, 1959 |